United States Patent Office 2,818,343
Patented Dec. 31, 1957

2,818,343
DRY PUDDING MIX COMPRISING CARBOXY-METHYL DEXTRAN

Harry A. Toulmin, Jr., Dayton, Ohio, assignor to The Commonwealth Engineering Company of Ohio, Dayton, Ohio, a corporation of Ohio No Drawing. Application October 3, 1955
Serial No. 538,284

14 Claims. (Cl. 99—139)

This invention relates to a dry, particulate pudding mix which, on the addition of water or milk, and with or without heating, is dispersed in the liquid to form a firm, smooth, palatable pudding.

The available pudding compositions for the most part comprise pudding starch derived from various sources, that is starch which is known to give the pudding effect, plus selected flavoring adjuvants. Invariably, those compositions tend to agglomerate into difficultly dispersible lumps, especially if used in fine powdered condition, when the reconstituting liquid is added, and are characterized by a starchy taste which reduces their palatability substantially. As is known, it is sometimes attempted to mask this objectionable starchy taste by using the flavoring ingredients in excessive amounts.

It is an object of this invention to provide a composition which, on addition of the appropriate edible liquid such as milk or water forms a smooth, palatable pudding which is essentially free from the, or has less of the starchy taste of conventional puddings of this type.

Another object is to provide a composition which, on addition of the liquid, forms a pudding having the firm body of a starch pudding, in contrast to the soft rennet custards for example, but which does not taste like starch and which has, therefore, superior eating qualities.

These and other objects are accomplished by the present invention which provides dry pudding mixes in which the sole or major base or bodying ingredient is carboxymethyl dextran derived from native, unhydrolyzed water-soluble dextran and containing an average of 0.5 to 3.0, preferably 0.5 to 1.5 carboxymethyl groups per anhydroglucose unit.

The native dextran may be obtained by the action of microorganisms, such as those of the *Leuconostoc mesenteroides* and *L. dextranicum* types, or the enzymes thereof, on sucrose. The dextran obtained initially by such procedures normally has a very high average molecular weight calculated to be in the millions. It may be and preferably is converted to the carboxymethyl ether at the high, native molecular weight. However, the dextran may be hydrolyzed to a lower molecular weight dextran by enzyme or acid splitting and converted to the carboxymethyl ether. In general, the water-soluble dextran may have a molecular weight between 2000 and that of the native, unhydrolyzed water-soluble dextran.

The carboxymethyl dextran may be obtained by the method disclosed in the pending application of L. J. Novak, Ser. No. 346,016, filed March 31, 1953, i. e. by reacting the dextran and carboxymethylating agent in an aqueous solution of a strong alkali metal hydroxide. Suitable carboxymethylating agents are alkali metal chloracetates, chloracetamide and chloracetic acid. Suitable alkali metal hydroxides include sodium, potassium and lithium hydroxide.

In general, the selected dextran, in aqueous solution or suspension, is treated with an excess of sodium or potassium chloracetate containing an excess of sodium or potassium hydroxide at a temperature of 50° C.–100° C. for ten minutes to two hours.

The molar ratio of alkali metal chloracetate to dextran is between 2:1 and 12:1, the molar ratio of alkali metal hydroxide to dextran is between 5:1 and 15:1, the molar ratio of water to dextran is between 70:1 and 120:1.

The reaction product is a viscous mass comprising the alkali metal salt of carboxymethyl dextran. The salt may be recovered by precipitating it from the crude reaction product with a water-miscible aliphatic alcohol or ketone such as methyl, ethyl, propyl, isopropyl or t-butyl alcohol, or acetone, and filtering off the precipitate.

The free ether is recovered from the salt by dissolving it with water, acidifying the solution to pH 2.0–3.0 adding a water-miscible aliphatic alcohol or ketone to precipitate the ether, and filtering off the latter.

The ether contains an average of 0.5–3.0 carboxymethyl groups per anhydroglucose unit, depending on the reaction conditions.

The following is an example of the production of a preferred carboxymethyl dextran for use as base or bodying ingredient in the pudding composition of the invention:

One hundred parts of particulate purified native (unhydrolyzed) dextran were dissolved in 700 parts of water. One hundred and fifty parts of sodium hydroxide were dissolved in 150 parts of water, and the dextran and sodium hydroxide solution were mixed together with agitation. Two hundred and twenty parts of monochloracetic acid were dissolved in 400 parts of water and 112.3 parts of anhydrous sodium carbonate were added to the solution. The resulting sodium chloracetate solution was then slowly added to the mixed dextran and sodium hydroxide solutions, and the mass was heated for one hour at 65° C. The reaction mass was then adjusted to pH 3.0 with hydrochloric acid and poured slowly into 1500 parts of methanol. The precipitate was substantially freed of methanol and water by passage through squeeze rolls, then dried under vacuum and reduced to particulate condition (80-mesh) in a hammer mill. The ether thus obtained contained, by analysis, an average of about 1.0 carboxymethyl group per anhydroglucose unit of the dextran.

The pudding compositions are prepared by intimately mixing finely divided carboxymethyl dextran with sugar and flavoring and other adjuvants selected for special purposes, in any suitable mixing device, optionally with the inclusion of finely divided pudding starch.

In the preferred embodiment, no starch is used and the carboxymethyl dextran is the sole base or bodying ingredient for the pudding.

However, if desired, 0.5 to 15% of starch may be included on the combined weights of the starch and carboxymethyl dextran. The puddings made up from the mixture do not have the objectionable "starchy" taste of wholly starch-based puddings.

The pudding starch which may be used is a pre-gelatinized starch obtained by subjecting raw starch to various treatments. For instance, the starch may be acted on by various chemical gelatinizing agents of the types of calcium chloride, relatively strong alkalis, or thiocyanates.

The pre-gelatinized starch may be obtained, also, by mixing a known pudding starch derived from, for example, maize, rice, arrowroot, tapioca or other known source with water, adding sugar, heating and drying the mixture, and grinding it to fine grain or particle size.

In a modification, the pudding starch may be mixed with water and a chemical gelatinizing agent such as alkaline compounds, i. e., alkali metal and alkaline earth metal chlorides or hydroxides such as sodium hydroxide, sodium carbonate, sodium bicarbonate, calcium hydroxide, various metal thiocyanates and preferably alkaline thiocyanates which normally increase the rehydration and gelatin characteristics of starch, and drying the mixture at elevated temperature.

The pudding may be made by mixing the dry composition with water or milk. The latter is preferred and these may be included in the composition a suitable edible casein coagulant. The coagulant may be an edible solid, crystalline organic acid such as tartaric or citric acid. The coagulant may also be a proteolytic enzyme such as trypsin, pepsin or rennin.

Those compositions including an organic acid as casein coagulant are generally particularly adapted to use in producing a fruit-flavored pudding. Those including a proteolytic enzyme may be preferred when puddings of other flavors, e. g., chocolate, butterscotch, vanilla or the like are desired.

If an acid is used as casein coagulant, the acidity may be neutralized by the inclusion of a neutralizing agent in the same package with the mix or as a separate item, preferably the former. Suitable neutralizing agents are calcium carbonate, calcium hydroxide, sodium carbonate, sodium bicarbonate, the corresponding salts of potassium, or any other alkaline salts which are stable when dry, soluble to the required extent, and physiologically inocuous.

The following examples are illustrative of specific dry, particulate pudding compositions according to the invention. The quantities listed for the different ingredients may be varied, of course, and certain of the ingredients may be omitted or substituted by equivalents.

*Example I*

| Ingredients | Quantities (Gms.) |
|---|---|
| Dry, particulate carboxymethyl dextran (derived from native, water-soluble dextran; D. S. 1.0) | 30.0 |
| Tartaric acid | 3.0 |
| Calcium hydroxide | 0.56 |
| Granulated sugar | 80.0 |
| Salt | 1.0 |

*Example II*

| Ingredients | Quantities (Gms.) |
|---|---|
| Dry, particulate carboxymethyl dextran (derived from hydrolyzed dextran of M. W. 5,000–50,000; D. S. 2.5) | 25.0 |
| Dry, particulate pregelatinized starch | 5.0 |
| Granulated sugar | 80.0 |
| Salt | 1.0 |
| Pepsin | 0.25 |

*Example III*

| Ingredients | Quantities (Gms.) |
|---|---|
| Dry, particulate carboxymethyl dextran (derived from hydrolyzed water-soluble dextran of M. W. 20,000–200,000; D. S. 1.5) | 37.0 |
| Cane sugar | 37.0 |
| Cocoa | 15.0 |
| Salt | 1.0 |
| Vanilla | 0.5 |

These compositions form smooth, palatable non-starchy puddings when mixed with one pint of milk and heated at 40–80° C. with continued stirring.

*Example IV*

| Ingredients | Quantities (Gms.) |
|---|---|
| Carboxymethyl dextran (derived from water-soluble native dextran; D. S. 1.0) | 30.0 |
| Tartaric acid | 3.0 |
| Calcium hydroxide | 0.56 |
| Granulated sugar | 80.0 |
| Salt | 1.0 |

*Example V*

| Ingredients | Quantities (Gms.) |
|---|---|
| Carboxymethyl dextran (derived from hydrolyzed water-soluble dextran of average M. W. about 30,000; D. S. 1.5) | 30.0 |
| Calcium hydroxide | 0.56 |
| Granulated sugar | 80.0 |
| Salt | 1.0 |

These compositions may be made into puddings by heating and stirring with one pint of milk or a mixture of milk and water. They are preferably mixed and heated under stirring with a pint of milk.

The taste of the puddings is superior to that of a starch-containing pudding prepared by adding a pint of milk to a mixture of 30.0 gms. of cornstarch, 80.0 gms. of granulated sugar, 1.0 gm. of salt and 0.25 gm. of pepsin.

The carboxymethyl dextran swells rapidly in milk and water to give a smooth, homogeneous dispersion which is firm and good to taste.

Carboxymethyl dextran is non-toxic, bland, tasteless and odorless. It can be eaten safely and is well-adapted to use as pudding base. Used without starch, as is preferred, carboxymethyl dextran does not influence the flavor of the pudding. Used with starch, carboxymethyl dextran yields a pudding of less starchy taste than if the pudding is wholly based on starch.

The carboxymethyl dextran may be the sole base or bodying ingredient of the composition. If starch is included it is preferred to limit it to 0.5–15% so that the carboxymethyl dextran comprises at least 85% by weight of the mixed base.

Various changes and modifications may be made in the details given herein. For instance, the pudding mix may comprise dry powdered milk or casein. Likewise, dry powdered milk and a casein coagulant may be added to the mixture of the base comprising carboxymethyl dextran, sweetening and flavoring adjuvants, to obtain a composition which, on addition of water, forms a "milk" pudding. This and other modifications may be made in practicing the invention without departing from the spirit and scope thereof and it is to be understood therefore, that it is not intended to limit the invention except as it is defined in the appended claims.

What is claimed is:

1. A dry, particulate pudding mix dispersible in milk and water to produce a smooth, palatable pudding and comprising a base or bodying ingredient at least 85% by weight of which is a carboxymethyl ether of water-soluble dextran containing an average of at least 1.0 up to 3.0 carboxymethyl groups per anhydroglucose unit.

2. A dry, particulate pudding mix dispersible in milk and water to produce a smooth, palatable pudding and comprising a base or bodying ingredient at least 85% by weight of which is a carboxymethyl ether of native, unhydrolyzed, water-soluble dextran containing an average of 1.0 carboxymethyl group per anhydroglucose unit.

3. A dry, particulate pudding mix dispersible in milk and water to produce a smooth, palatable pudding and comprising, as sole base or bodying agent, a carboxymethyl ether of water-soluble dextran containing an average of at least 1.0 up to 3.0 carboxymethyl groups per anhydroglucose unit.

4. A dry, particulate pudding mix dispersible in milk to produce a smooth, palatable pudding and comprising, as sole base or bodying agent, a carboxymethyl ether of native, unhydrolyzed, water-soluble dextran containing an average of about 1.0 carboxymethyl group per anhydroglucose unit.

5. A dry, particulate pudding mix dispersible in milk to produce a smooth, palatable pudding and comprising (a) a base or bodying ingredient consisting of a carboxymethyl ether of native, unhydrolyzed, water-soluble dextran containing about 1.0 carboxymethyl group per anhydroglucose unit and (b) an edible casein coagulant.

6. A dry, particulate pudding mix dispersible in milk to produce a smooth, palatable pudding and comprising (a) a base or bodying ingredient consisting of a carboxymethyl ether of native, unhydrolyzed, water-soluble dextran containing about 1.0 carboxymethyl group per anhydroglucose unit, (b) milk powder, and (c) an edible casein coagulant.

7. A pudding mix as in claim 6, characterized in that the casein coagulant is an edible organic acid.

8. A pudding mix as in claim 6, characterized in that the casein coagulant is an edible proteolytic enzyme.

9. A dry, particulate pudding mix dispersible in milk and water to produce a smooth, palatable pudding and comprising (a) a base or bodying ingredient at least 85% of which is a carboxymethyl ether of water-soluble dextran containing an average of at least 1.0 up to 3.0 carboxymethyl groups per anhydroglucose unit and (b) a flavoring adjuvant.

10. A dry, particulate pudding mix dispersible in milk to produce a smooth, palatable pudding and comprising (a) as base or bodying ingredient a carboxymethyl ether of native, unhydrolyzed, water-soluble dextran containing an average of about 1.0 carboxymethyl group per anhydroglucose unit, (b) an edible casein coagulant, and (c) a flavoring adjuvant.

11. A dry, particulate pudding mix dispersible in milk and water to produce a smooth, palatable pudding and comprising (a) as base or bodying agent a mixture of a carboxymethyl ether of water-soluble dextran containing an average of at least 1.0 up to 3.0 carboxymethyl groups per anhydroglucose unit and pudding starch in an amount of 0.5% to 15% by weight on the combined weight of the dextran and starch, (b) an edible casein coagulant and (c) a flavoring adjuvant.

12. A dry, particulate pudding mix dispersible in milk to produce a smooth, palatable pudding and consisting essentially of, by weight, 30.0 parts of a carboxymethyl ether of native, unhydrolyzed, water-soluble dextran containing an average of about 1.0 carboxymethyl group per anhydroglucose unit, 3.0 parts of tartaric acid, 0.56 part of salt.

13. A dry, particulate pudding mix dispersible in milk to produce a smooth, palatable pudding and consisting essentially of, by weight, 25.0 parts of a carboxymethyl ether of hydrolyzed dextran having an average molecular weight of 5000 to 50,000 the ether containing an average of about 2.5 carboxymethyl groups per anhydroglucose unit, 5.0 parts of pudding starch, 80.0 parts of granulated sugar, 1.0 part of salt and 0.25 part of pepsin.

14. A dry, particulate pudding mix dispersible in milk and consisting essentially of, by weight, 37.0 parts of a carboxymethyl ether of a hydrolyzed dextran having average molecular weight 20,000 to 200,000 the ether containing an average of 1.5 carboxymethyl groups per anhydroglucose unit, 37 parts of cane sugar, 15.0 parts of cocoa, 1.0 part of salt, and 0.5 part of vanilla.

References Cited in the file of this patent
UNITED STATES PATENTS

| | | |
|---|---|---|
| 2,089,217 | Mahoney | Aug. 10, 1937 |
| 2,409,816 | Wadsworth et al. | Oct. 22, 1946 |
| 2,500,179 | Hinz et al. | Mar. 14, 1950 |
| 2,602,082 | Owen | July 1, 1952 |
| 2,609,368 | Gaver | Sept. 2, 1952 |